(12) United States Patent
Gits et al.

(10) Patent No.: US 7,143,182 B1
(45) Date of Patent: Nov. 28, 2006

(54) SMART SECRETARY FOR ROUTING CALL OBJECTS IN A TELEPHONY NETWORK

(75) Inventors: Peter Michael Gits, Agoura Hills, CA (US); Dale J. Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 09/698,779

(22) Filed: Oct. 27, 2000

Related U.S. Application Data (63) Continuation of application No. 60/223,824, filed on Aug. 8, 2000.

(51) Int. Cl.
G06F 15/173 (2006.01)
H04M 3/42 (2006.01)

(52) U.S. Cl. .................... 709/238; 379/201.03
(58) Field of Classification Search .......... 709/238, 709/204, 200; 379/90.01, 93.01, 265.02, 379/265.11, 265.13, 201.03, 201.09; 455/412.1, 455/412.2, 414 X, 4, 17
See application file for complete search history.

(56) References Cited

U.S. PATENT DOCUMENTS

| | | | |
|---|---|---|---|
| 4,585,906 A * | 4/1986 | Matthews et al. | 379/88.26 |
| 4,972,367 A | 11/1990 | Burke | 364/900 |
| 5,036,535 A * | 7/1991 | Gechter et al. | 379/265.11 |
| 5,049,873 A | 9/1991 | Robins et al. | 340/825.06 |
| 5,241,588 A * | 8/1993 | Babson et al. | 379/201.03 |
| 5,299,207 A | 3/1994 | Fujii | 370/29.1 |
| 5,327,486 A * | 7/1994 | Wolff et al. | 379/93.23 |
| 5,432,839 A * | 7/1995 | DeLuca | 340/7.21 |
| 5,455,854 A * | 10/1995 | Dilts et al. | 379/201.04 |
| 5,493,692 A * | 2/1996 | Theimer et al. | 455/26.1 |
| 5,524,137 A * | 6/1996 | Rhee | 379/88.01 |
| 5,594,859 A | 1/1997 | Palmer et al. | |
| 5,638,514 A | 6/1997 | Yoshida et al. | 395/200.11 |
| 5,655,015 A * | 8/1997 | Walsh et al. | 379/201.04 |
| 5,742,763 A * | 4/1998 | Jones | 719/317 |
| 5,742,905 A * | 4/1998 | Pepe et al. | 455/461 |
| 5,787,262 A | 7/1998 | Shakib et al. | 395/200.35 |
| 5,799,306 A | 8/1998 | Sun et al. | 707/10 |
| 5,809,478 A | 9/1998 | Greco et al. | |
| 5,867,495 A | 2/1999 | Elliott et al. | |
| 5,884,324 A | 3/1999 | Cheng et al. | |
| 5,905,789 A * | 5/1999 | Will | 379/211.03 |
| 5,928,325 A | 7/1999 | Shaughnessy et al. | 709/206 |
| 5,953,050 A | 9/1999 | Kamata et al. | |
| 6,009,103 A | 12/1999 | Woundy | |
| 6,029,175 A | 2/2000 | Chow et al. | 707/104 |
| 6,061,740 A | 5/2000 | Ferguson et al. | |

(Continued)

OTHER PUBLICATIONS

Benedicto, Regions: A Scalable Infrastructure for Scoped Service Location in Ubiquitous Computing, May 1999, Massachusetts Institute of Technology 1999, pp. 2-109.

(Continued)

*Primary Examiner*—Bharat Barot
*Assistant Examiner*—Kevin T Bates
(74) *Attorney, Agent, or Firm*—Marger Johnson & McCollom, P.C.

(57) ABSTRACT

A message-processing agent receives an object from a space in a Scalable Infrastructure system. The message-processing agent determines the destination of the object and checks a preference setting for the destination. The message-processing agent then routes the object to its destination as determined by the preference settings, possibly altering the destination in favor of an alternate destination indicated by the preference settings.

6 Claims, 7 Drawing Sheets

U.S. PATENT DOCUMENTS

| | | | |
|---|---|---|---|
| 6,072,522 A | 6/2000 | Ippolito et al. | |
| 6,091,811 A * | 7/2000 | Chang et al. | 379/265.02 |
| 6,091,948 A * | 7/2000 | Carr et al. | 455/414.1 |
| 6,092,102 A * | 7/2000 | Wagner | 340/7.29 |
| 6,094,213 A | 7/2000 | Mun et al. | |
| 6,137,876 A | 10/2000 | Wong et al. | 379/246 |
| 6,161,137 A | 12/2000 | Ogden et al. | |
| 6,170,015 B1 | 1/2001 | Lavian | 709/232 |
| 6,209,018 B1 * | 3/2001 | Ben-Shachar et al. | 718/105 |
| 6,226,666 B1 | 5/2001 | Chang | |
| 6,249,570 B1 | 6/2001 | Glowny et al. | 379/88.22 |
| 6,253,256 B1 | 6/2001 | Wollrath et al. | 709/330 |
| 6,256,663 B1 | 7/2001 | Davis | |
| 6,330,319 B1 * | 12/2001 | Moghnie | 379/201.03 |
| 6,335,927 B1 | 1/2002 | Elliott et al. | |
| 6,353,661 B1 * | 3/2002 | Bailey, III | 379/93.25 |
| 6,356,633 B1 * | 3/2002 | Armstrong | 379/265.11 |
| 6,373,517 B1 | 4/2002 | Davis et al. | |
| 6,393,481 B1 * | 5/2002 | Deo et al. | 709/224 |
| 6,412,017 B1 | 6/2002 | Straube et al. | |
| 6,421,686 B1 | 7/2002 | Martin, Jr. | 707/201 |
| 6,425,005 B1 * | 7/2002 | Dugan et al. | 709/223 |
| 6,434,594 B1 | 8/2002 | Wesemann | 709/201 |
| 6,442,565 B1 | 8/2002 | Tyra et al. | 707/103 |
| 6,457,065 B1 | 9/2002 | Rich et al. | 709/328 |
| 6,463,446 B1 | 10/2002 | Wollrath et al. | |
| 6,493,671 B1 | 12/2002 | Ladd | |
| 6,532,218 B1 | 3/2003 | Shaffer et al. | |
| 6,559,863 B1 | 5/2003 | Megiddo | |
| 6,560,637 B1 | 5/2003 | Dunlap et al. | |
| 6,564,216 B1 | 5/2003 | Waters | 707/100 |
| 6,578,074 B1 | 6/2003 | Bahlmann | 709/203 |
| 6,587,455 B1 | 7/2003 | Ray et al. | 370/352 |
| 6,615,223 B1 | 9/2003 | Shih et al. | 707/201 |
| 6,636,238 B1 | 10/2003 | Amir et al. | |
| 6,643,650 B1 * | 11/2003 | Slaughter et al. | 707/10 |
| 6,697,806 B1 | 2/2004 | Cook | 707/9 |
| 6,714,979 B1 | 3/2004 | Brandt et al. | 709/225 |
| 6,724,896 B1 | 4/2004 | Beckett et al. | 380/49 |
| 6,751,657 B1 * | 6/2004 | Zothner | 709/220 |
| 6,788,980 B1 | 9/2004 | Johnson | 700/1 |
| 6,789,077 B1 | 9/2004 | Slaughter et al. | |
| 6,792,466 B1 | 9/2004 | Salulpaugh et al. | 709/229 |
| 6,795,108 B1 | 9/2004 | Jarboe et al. | |

OTHER PUBLICATIONS

Arnold, The Jini Architecture: Dynamic Services in a Flexible Network, ACM, Jun. 1999.

Aschemann et al., A Framework for the Integration of Legacy Devices into a Jini Management Federation, Springer-Verlag, Oct. 1999.

Arnold, "*The Jini Architecture: Dynamic Services in a Flexible Network,*" 1999, 6 pgs.

Aschermann et al., "A Framework for the Integration of Legacy Devices into a Jini Management Federation," *Springer-Verlag,* Oct. 1999, 12 pgs.

Benedicto, "Regions: A Scalable Infrastructure for Scoped Service Location in Ubiquitous Computing," *Massachusetts Institute of Technology,* May 1999, pp. 2-109.

* cited by examiner

SMART SECRETARY FOR ROUTING CALL OBJECTS IN A TELEPHONY NETWORK

RELATED APPLICATION DATA

This application is a continuation of, and claims priority to, U.S. Provisional Patent Application 60/223,824 filed Aug. 8, 2000.

CROSS REFERENCE TO RELATED APPLICATIONS

This application relates to the following US patent applications, all commonly assigned to the assignee of this application.

| Ser. No. | Atty. Dkt. No. | Title | Filed |
|---|---|---|---|
| 09/676,147 | 2705-128 | Fully Distributed, Scalable Infrastructure Communication System | Sep. 29, 2000 |
| 09/711,378 | 2705-139 | Replication of a Scalable Infrastructure System | Nov. 9, 2000 |
| 09/695,750 | 2705-140 | Object Agents in a Scalable Infrastructure System | Oct. 24, 2000 |
| 09/746,798 | 2705-141 | Memory Management of a Scalable Infrastructure System | Dec. 20, 2000 |
| 09/694,740 | 2705-142 | Interconnective Agents in a Scalable Infrastructure System | Oct. 23, 2000 |
| 09/713,155 | 2705-143 | Multicasting and Joining in a Scalable Infrastructure System | Nov. 14, 2000 |
| 09/697,821 | 2705-144 | Scalable Infrastructure Community Service | Oct. 26, 2000 |
| 09/882,221 | 2705-187 | Net Lurkers | Jun. 15, 2001 |

FIELD

This invention pertains to object routing and, more particularly, to object routing in a Scalable Infrastructure system.

BACKGROUND

Until recently, it was unusual for people to have more than one telephone number at which they could be contacted. People generally could only be reached at home: with limited exceptions people were not accessible at work.

In the last few decades, this fact has changed. People have become more reachable at work. Facsimile machines have made possible the electronic transfer of written communications. Pagers, and later cellular and satellite telephones, have allowed people to receive communications even when not within reach of a land-line telephone. With the increased popularity of the Internet, more and more people are installing multiple telephone lines to their homes. And people are becoming increasingly mobile, having more than one office at which they work (and hence, multiple work telephones).

But with each of these new forms of communication, a new telephone number is required. Finding the right number to call has become a more complicated proposition. This is especially true of home, work, and cellular/satellite telephones, where there can be multiple different ways to reach a person, but not all telephone numbers will work at any given time.

If a telephone call is placed to one of a person's telephone numbers, if the person is not currently accessible at that telephone number, the caller must try another of the callee's telephone numbers. If the callee is not at the second telephone number, the caller must try a third telephone number, and then a fourth, and so on. Eventually, either the caller will reach the callee or will give up. The process is totally outside the callee's control and is totally dependent on the caller's luck in selecting a telephone number at which the callee can be reached.

This problem is exacerbated when the callee knows he will not be available. Unless there is a mechanism for the callee to route calls to someone who can take a message (for example, an assistant or voicemail), the call will never reach the callee. And even when such mechanisms are available for forwarding calls, they have limited capabilities. The mechanisms can only forward calls to a single destination, providing no flexibility for the possibility that the forwarded destination may be unable to take the call.

The present invention addresses these and other problems associated with the prior art.

SUMMARY

The Smart Secretary is an agent of the Scalable Infrastructure system designed to route objects according to a user's preferences. When the Scalable Infrastructure system notifies the Smart Secretary that an object exists in the space for the Smart Secretary, the Smart Secretary picks up the object. The Smart Secretary the determines for which user the object is destined and accesses the user's preference settings. (A default preference setting specifies that the object is to routed only according to the directions enclosed with the object.) The Smart Secretary then routes the object according to the user's preference settings, even if they override the specified destination included with the object.

The foregoing and other features, objects, and advantages of the invention will become more readily apparent from the following detailed description, which proceeds with reference to the accompanying drawings.

DETAILED DESCRIPTION

Figure 1:
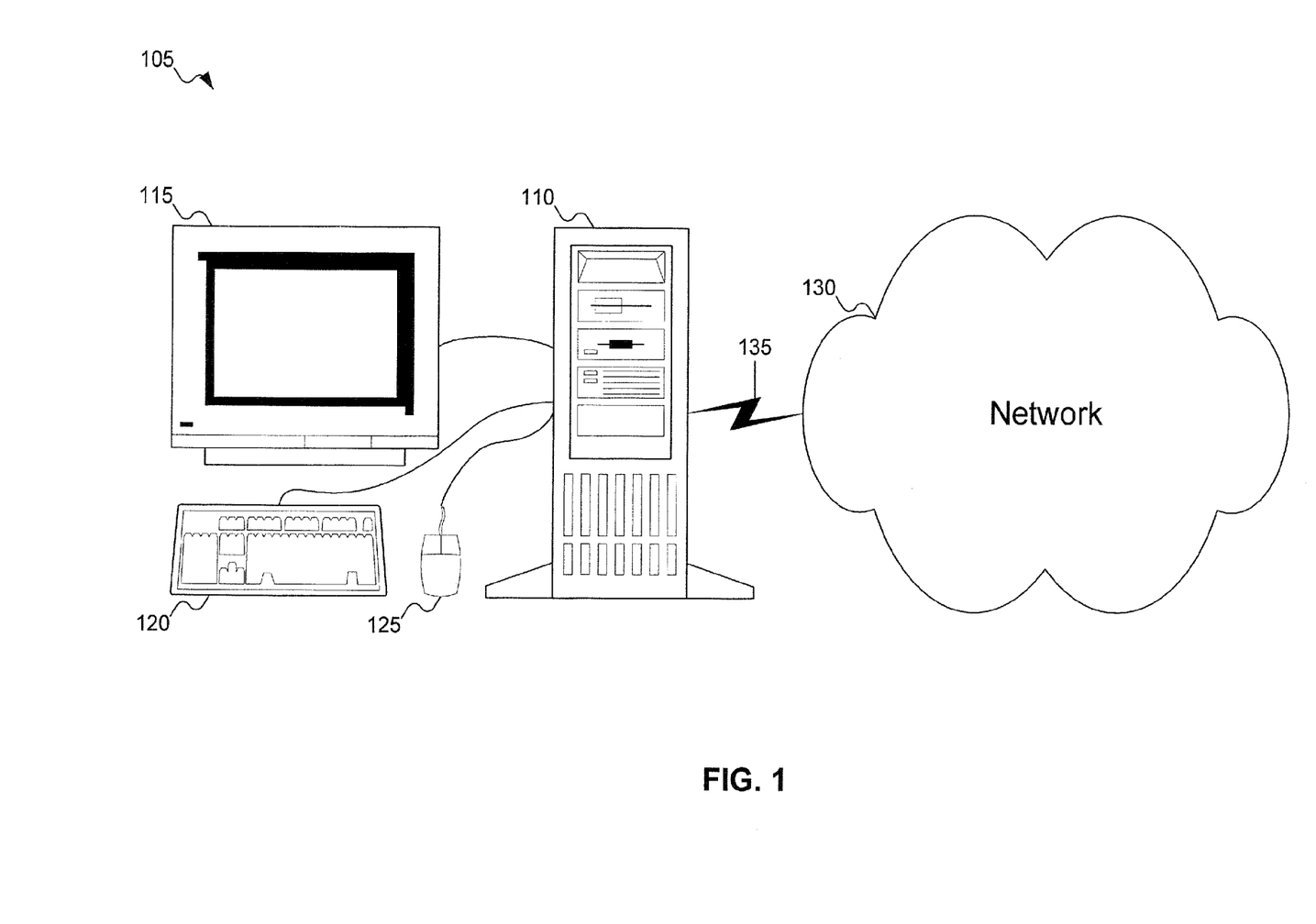
FIG. 1 shows a computer on which the preferred embodiment of the invention is operable, connected to a network.

In FIG. 1, computer system 105 is connected to network 130 via network connection 135. A Scalable Infrastructure system for use in distributed communication systems as described in U.S. patent application Ser. No. 09/676,147, titled "Fully Distributed, Scalable Infrastructure, Communication System," filed Sep. 29, 2000, operates over network 130. Smart Secretary, running on computer system 105, is part of the Scalable Infrastructure system. The following material is drawn from U.S. patent application Ser. No. 09/676,147, titled "Fully Distributed, Scalable Infrastructure, Communication System," filed Sep. 29, 2000:

The Scalable Infrastructure system uses a combination of a persistent store and agents to provide a communication system extensible to nearly all types of interfaces and any number of users and applications. The Scalable Infrastructure system defines Communities around the persistent store, or space, with space or non-space oriented interpreters, referred to here as Double Agents. Double Agents will be discussed in more detail further.

A Community as used here will refer to a collection of these agents and a persistent store. Any type of persistent store could be used, with the capabilities of having objects inserted into the store such that they do not lose their attributes and of providing a notification service as the objects are inserted. In this particular example, JavaSpaces™ will be used as the persistent stores, but the Scalable Infrastructure system is applicable to any similar technology. For ease of discussion, the persistent stores will be referred to as "Spaces." Spaces can be used in several different implementations, and the following discussion is meant only as an example.

By maintaining the "wellness" information of agents and services within a Community, the Community Service also has the ability to launch new clones of these agents and services throughout the different Communities based on load metrics. This provides for some dynamic distributed load behavior. For example, if one where to be hit with a 1000 calls within a minute, the Community Service could launch another (N) agents anywhere within the Community to handle this increased load. This Service could also leverage addition hardware that is on standby to increase performance during peak loads. Alternatively, it could shut down lightly utilized agents and unused Services when the load decreases. Members interact with the Spaces via the agents, and unused agents can be removed to make room for new agents. Most of these agents are what will be referred to as "Double Agents."

Double Agents are analogous to translation modules. They can communicate with one protocol on one side and the protocol used in the Space on the other. Each Space will have a set of dedicated Double Agents. For example, a Space with a phone member will have a phone Double Agent. It may interact according to a common protocol, such as SIP (session initiation protocol), with a SIP phone. It will then convert the request or other communication from the SIP phone to Space protocols. The Space protocol will more than likely involve a typing process to type the communication according to Java™ types and then placing it as an object in the Space.

Double Agents are notified of new objects placed in the Space by a publish-and-subscribe process. Devices that interact with certain types of objects will subscribe with the Space to be notified when such an object is inserted into the Space. The Space then publishes the new object to all of the subscribed Double Agents. The subscribed Double Agents then pick it up from the Space. The object placed in the Space will be leased, and if no agent picks up the object before the lease expires, the object will be removed.

The nature of the Double Agents allows the system to be extremely scalable and extensible. If the system is to be made larger, a larger number of any type of Double Agents can be added. If more types of interfaces are needed, all the system requires to extend to include these are Double Agents written for those devices. The production of Double Agents is expedited by use of a class library.

An individual Community revolves around a Space, usually a local Space. The Space allows decoupling of associations between applications, clients, servers, proxies, etc., and acts as an intermediary. It also allows for typing of objects as well as a notification process for any new objects entered into the Space. Using the Space alleviates the problems with Jini™, noted above, when used in combination with the Double Agents and the Community Service.

(JavaSpaces, Java, and Jini are trademarks or registered trademarks of Sun Microsystems, Inc. in the United States and other countries.)

Figure 2:
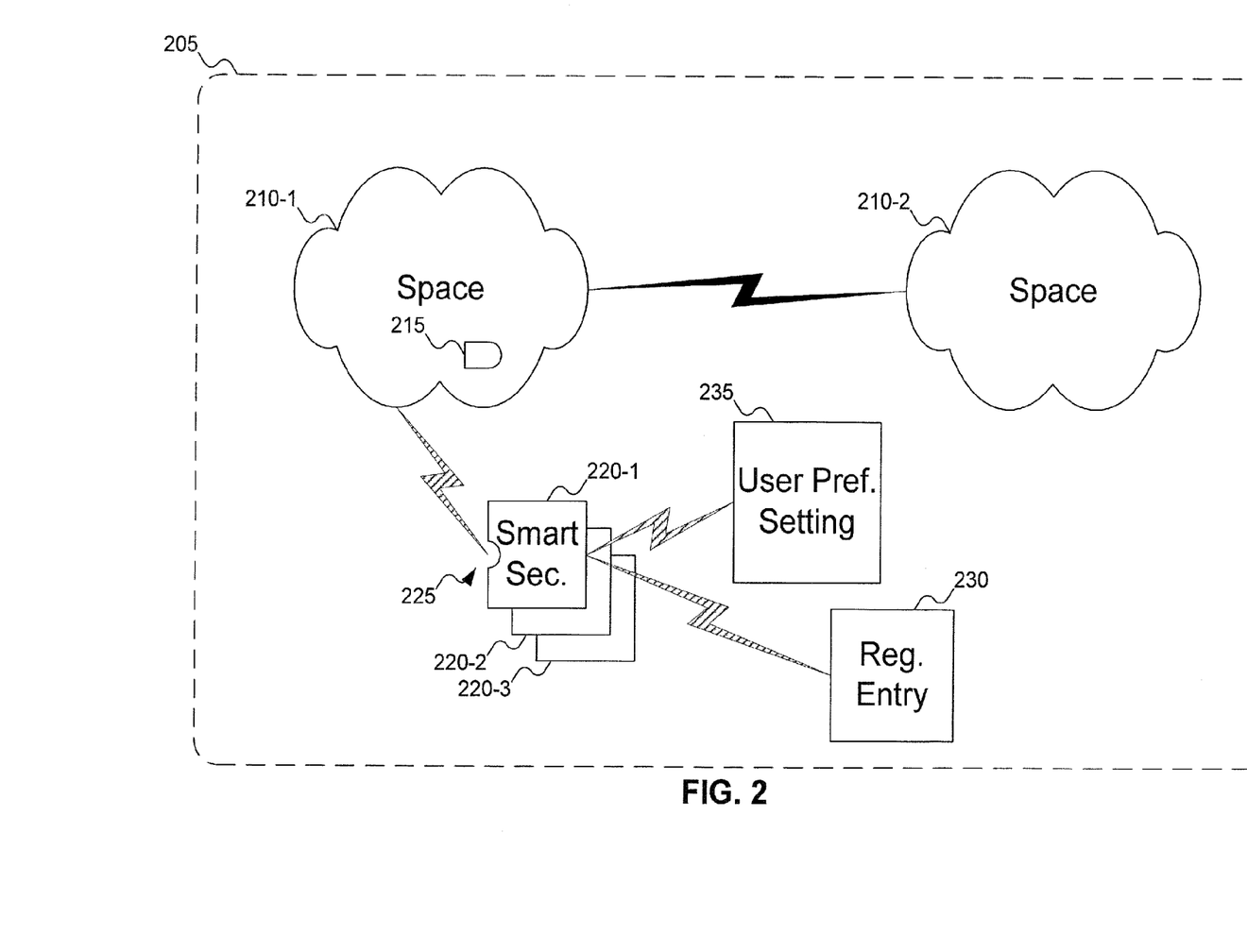
FIG. 2 shows a Scalable Infrastructure system in which a Smart Secretary according to the preferred embodiment of the invention can operate.

FIG. 2 shows a Scalable Infrastructure system in which a Smart Secretary according to the preferred embodiment of the invention can operate. In FIG. 2, Scalable Infrastructure system 205 includes two spaces, 210-1 and 210-2. However, a person skilled in the art will recognize that there can be more or fewer spaces in Scalable Infrastructure system 205. A smart secretary object 215 has been dropped in space 210-1 (perhaps by a Double Agent for a telephone: see FIG. 4). Scalable Infrastructure system 205 alerts Smart Secretary 220-1 that a smart secretary object has been dropped in space 210-1. In FIG. 2, the fact that object 215 is a smart secretary object is graphically represented by the arched shape of the object, designed to match cutout 225 of Smart Secretary 220-1, but a person skilled in the art will recognize that this is simply a visual convenience. Smart Secretary 220-1 accesses smart secretary object 215 and determines (from the contents of smart secretary object 215) the user for which smart secretary object 215 is destined. Smart Secretary 220-1 then checks to see if registration entry 230 exists for the user for which the smart secretary object 215 is destined. If registration entry 230 exists, then Smart Secretary 220-1 accesses that user's preference setting 235 (if the user has not provided a preference setting, Smart Secretary 220-1 routes smart secretary object 215 using default routing). (Preference settings will be explained more with reference to FIG. 4 below.) Smart Secretary 220-1 can then route the communication wrapped in smart secretary object 215 according to the appropriate preference settings.

A person skilled in the art will recognize that there can be more than one Smart Secretary in Scalable Infrastructure system 205. For example, in FIG. 2, there are three Smart Secretaries 220-1, 220-2, and 220-3. Any of these Smart Secretaries can receive the notice from Scalable Infrastructure system 205 of smart secretary object 215 and respond to it.

Because Smart Secretary processes objects on behalf of sources, Smart Secretary is effectively an agent for the source. But Smart Secretary 220-1 is a part of the Scalable Infrastructure system and otherwise separate from any source that causes a smart secretary object to be dropped into space 210-1. The use of the term "agent" should not be considered to tie Smart Secretary to a particular object source.

Figure 3A:
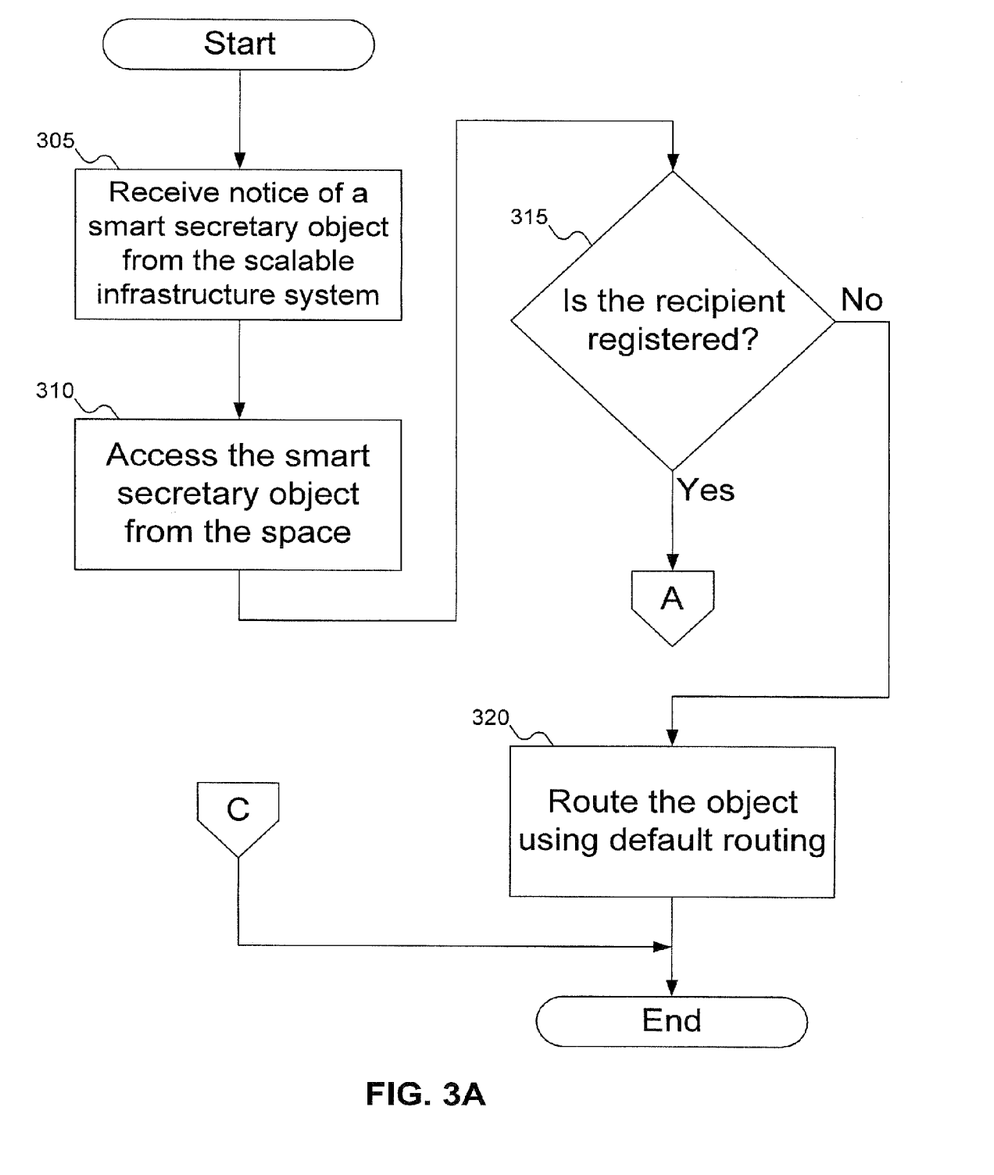
FIGS. 3A–3C show a flowchart of the method used by the Smart Secretary of FIG. 2 for routing objects.
Figure 3B:
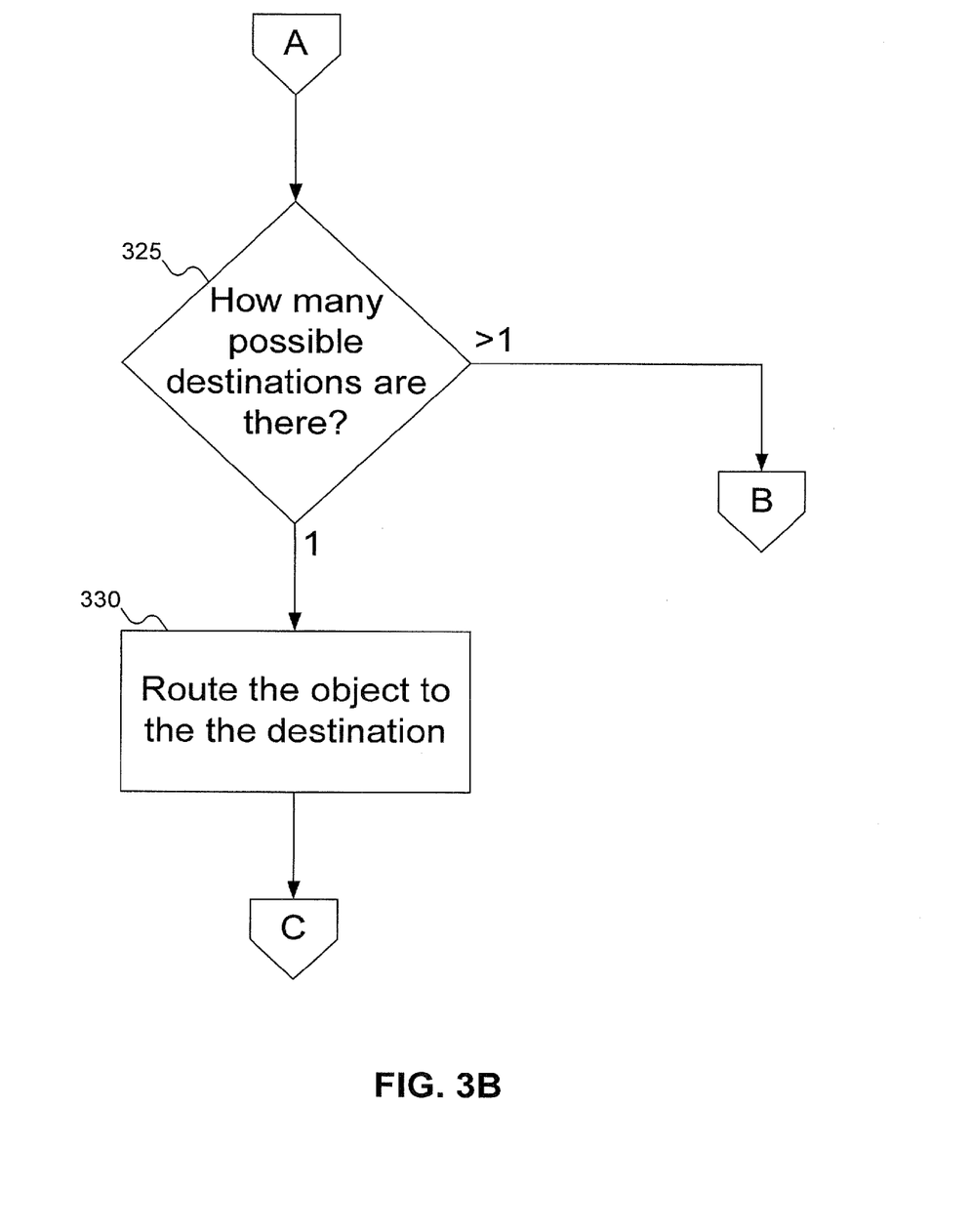
Figure 3C:
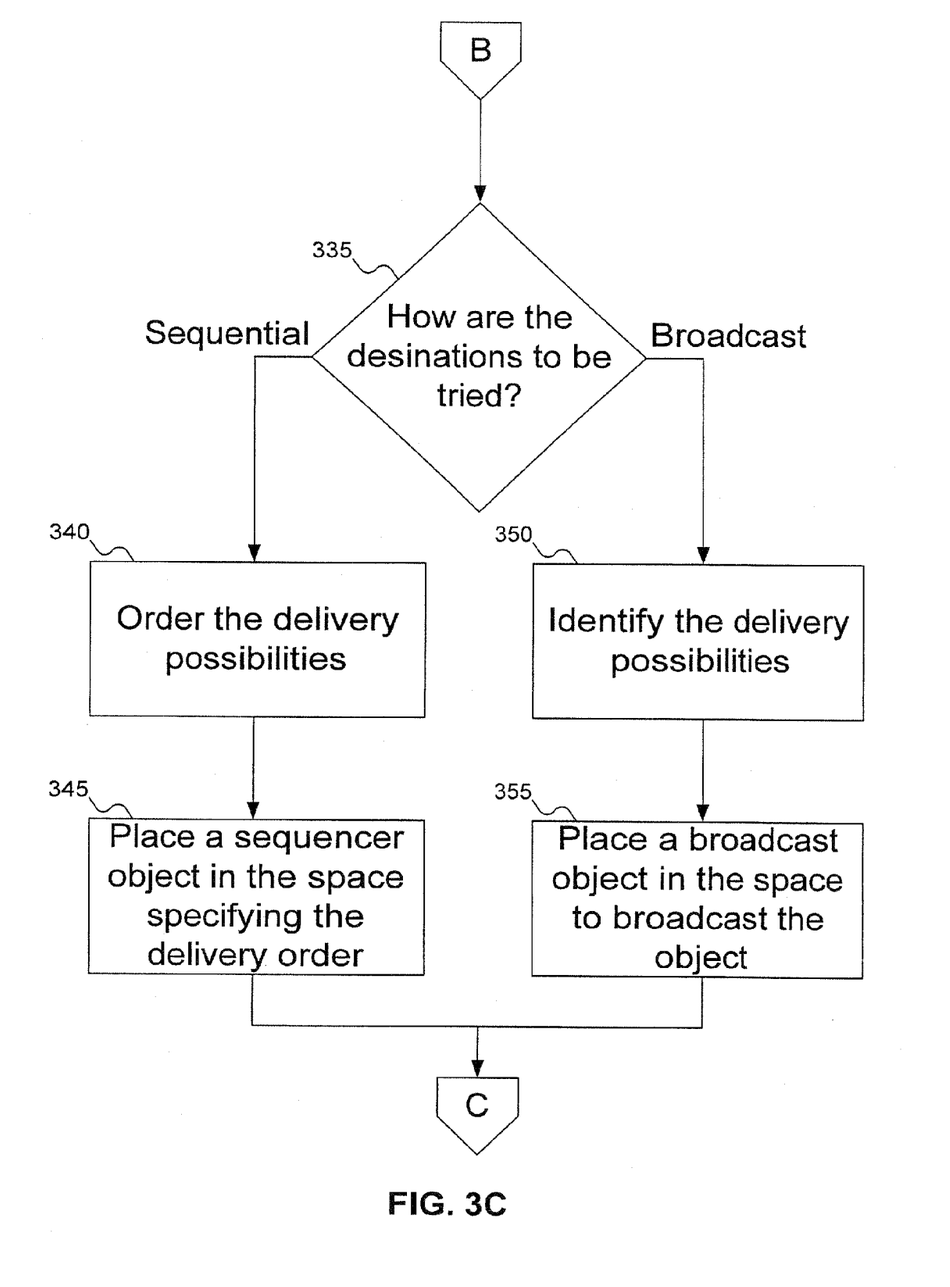

FIGS. 3A–3C shows a flowchart of the method used by the Smart Secretary of FIG. 2 for routing objects. At step 305, the Smart Secretary receives a notice from the Scalable Infrastructure system that a smart secretary object exists in the space. At step 310, the Smart Secretary accesses the smart secretary object from the space. At step 315, the Smart Secretary checks to see if the recipient is a registered user in the Scalable Infrastructure system. If the recipient is not registered, then at step 320 the object is routed using default routing (i.e., the object is sent to the specified destination without change). Otherwise, at step 325, the Smart Secretary checks to see how many possible routing destinations are included in the user preference settings. If only one routing destination is included in the user preference settings, then at step 330 the smart secretary object is routed to the listed destination. (The smart secretary wrapper is also removed from the object and the object is wrapped in the appropriate wrapper for the routing destination.)

If there is more than one possible destination for the object, then at step 335, the Smart Secretary checks to see how the object is to be routed through the destinations. If the object is to be routed using sequential delivery, at step 340, the routing destinations are ordered. The object loses its smart secretary wrapper and is wrapped with a sequence wrapper, which includes the ordered list of routing destinations. Then, at step 345, the sequence object is then dropped into the space for a sequence object to try to route the object to the destinations in order. Otherwise, if the object is to be broadcast to the destinations, then at step 350 the destinations are identified, and at step 355 a broadcast object is placed in the space to broadcast the object to the destinations. As with sequential routing, the object loses its smart secretary wrapper and is wrapped with a broadcast wrapper. Additional information about the broadcast agent can be found in U.S. patent application Ser. No. 09/713,155, titled "Multicasting and Joining in a Scalable Infrastructure System," filed Nov. 14, 2000.

Figure 4:
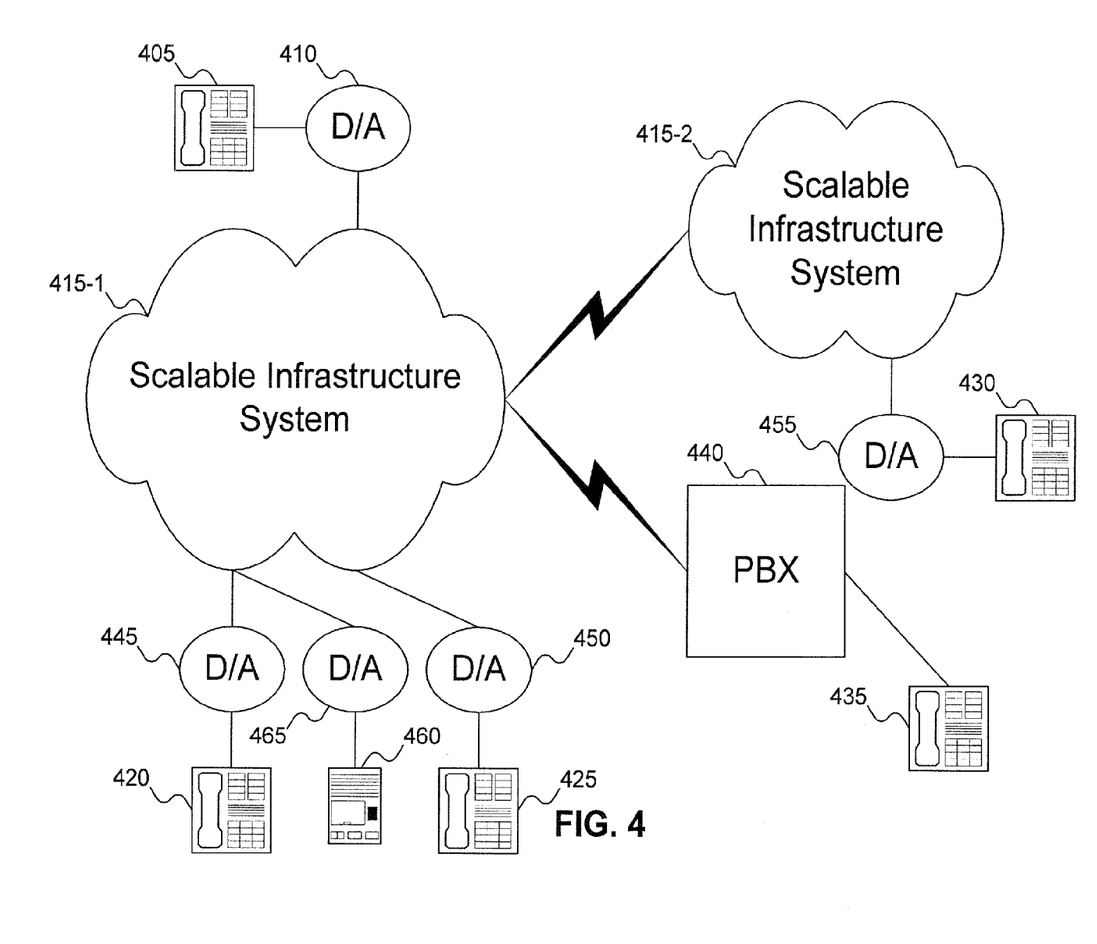
FIG. 4 shows telephones and answering machines connected to Communities as in FIG. 2.

Now that the operation of the Smart Secretary has been explained, its use can be described. FIG. 4 shows telephones and voicemail connected to Communities as in FIG. 2. In FIG. 4, a caller places a call from Internet protocol (IP) telephone 405. (Although FIG. 4 demonstrates the use of Smart Secretary in the context of telephonic communication, a person skilled in the art will recognize that Smart Secretary is extensible beyond telephonic communication: for example, computer communication across an internetwork, either local, wide-area, or global.) Double Agent 410 translates the data from IP telephone 405 into objects understandable by Scalable Infrastructure system 415-1 (such as Scalable Infrastructure system 205 of FIG. 2). The caller may be calling IP telephones 420 or 425 (IP telephones on the same Scalable Infrastructure system), IP telephone 430 (an IP telephone on a different Scalable Infrastructure system, such as Scalable Infrastructure system 415-2), or a regular telephone, such as telephone 435, accessible via private branch exchange (PBX) 440. Because they are part of Communities, Double Agent 445 and 450 interface between IP telephones 420 and 425, respectively and Scalable Infrastructure system 415-1; similarly, Double Agent 455 interfaces between IP telephone 430 and Scalable Infrastructure system 415-2.

For purposes of FIG. 4, assume that the called telephone is IP telephone 420. When the user dials IP telephone 420 from IP telephone 405, Double Agent 410 drops a smart secretary object in the space within Scalable Infrastructure system 415-1. The smart secretary object (naturally) includes the dialed telephone number, which the Smart Secretary uses to determine the intended recipient. After determining the intended recipient, the Smart Secretary accesses the callee's preference settings.

Assume for the moment that the preference settings indicate that the callee has made no preference settings (i.e., the callee wants all calls routed to the destination telephone as would normally happen). The Smart Secretary then forwards the object (minus the smart secretary wrapper) to Double Agent 445. Double Agent 445 causes IP telephone 420 to ring, and if the recipient doesn't answer, eventually the caller will hang up.

Now consider the possibility that the callee may be a manager who is frequently away from his desk. The callee may consider that all calls are important, and should be answered either by himself or his assistant. The callee can set his preference settings to indicate that IP telephone 420 is to ring five times. If IP telephone 420 is not answered within five rings, then IP telephone 425 (his assistant's telephone) is to ring five times. If his assistant does not answer within five rings, then voicemail 460 (supported by Double Agent 465) is to take the call. In this way, the callee can try to ensure that someone takes the call, even if the call is bounced around the network several times. This is all done transparently to the caller: the caller at IP telephone 405 is not aware that his call is being rerouted to different destinations.

If the manager works out of multiple offices, he can set his preferences to ring each of his phones in turn, until someone picks up. So, in the above example, if the manager alternates between IP telephones 420 and 430 (for example, IP telephone 420 in Los Angeles and IP telephone 430 in New York City), IP telephone 420 can be set to ring first, then IP telephone 430, then the manager's assistant's IP telephone 425, and finally voicemail 460, until someone takes the call. Note that the fact that IP telephones 420, 430, and 425 are part of different Communities does not affect the preference setting: transfer of a call between Communities 415-1 and 415-2 is handled seamlessly. See related U.S. patent application Ser. No. 09/694,740, titled "Interconnective Agents in a Scalable Infrastructure System," filed Oct. 23, 2000, for more information about transferring communications between Communities.

Finally, if the callee spends his time at telephone 435, which is not connected to a Scalable Infrastructure system (for example, the callee can be out in the field with only a cellular or satellite telephone for receiving calls), the callee can set his preference settings to forward calls to telephone 435. The fact that calls to telephone 435 must pass through PBX 440 does not affect the operation of Smart Secretary.

When Smart Secretary routes an object using the sequencer agent or the broadcast agent, it may happen that Smart Secretary is re-invoked. Consider the earlier example of a manager who wants his calls routed to his assistant if he does not answer the call within five rings. The assistant may have her own preferences. For example, knowing that she is working at home one day, the assistant may set her preferences to route calls from her desk to her home. Thus, even though the manager specified that telephone on his assistant's desk was to ring, the call is routed to the assistant at her home, as desired.

Where Smart Secretary is re-invoked in this matter, two issues arise. The first issue is loops in object routing. In the manager/assistant example above, it can happen that the manager and assistant each, in an effort to make sure a call is answered, has his calls routed to the other in case no-one picks up at the primary destination. Because Smart Secretary is invoked for routing calls to both parties, a call to the manager will be routed to the assistant. When the assistant does not answer, the call will be routed according to the assistant's preferences, and will be routed back to the manager, completing the loop. Such loops can be avoided by having the gateway examine the call data stored in the object. In the above manager/assistant example, when the call is routed back to the manager, the gateway examines the call data and determines that the call had been routed to the manager previously. The gateway then intentionally does not deliver the object, thereby breaking the loop.

The second issue is the priority of routing destinations as new destinations are located. Consider a situation where a user has his preferences set up to route incoming calls to three different destinations sequentially. For clarity, identify the user as A and the call destinations as A1, A2, and A3. As discussed above, the users at each of these destinations can specify their own preferences. For example, call destination A2 can be the telephone of a user B, who has set his preferences up to route calls to destinations B1, B2, and B3. When the sequencer agent attempts to route the call to destination A2, user B's preferences are invoked via Smart Secretary. In the preferred embodiment, when Smart Secretary processes user B's preferences, it is unaware of any prior routing of the call according to user A's preferences. But because the smart secretary object dropped by the sequencer includes a flag, Smart Secretary knows to return the sequence of user B's preferences to the sequencer (via a flag included in the sequencer object that specifies the sequencer agent). Sequencer can then insert the sequence returned by Smart Secretary into the earlier sequence. Thus, after the sequencer inserts user B's preferences, the sequence of destinations becomes A1, B1, B2, B3, and A3.

Although the above description is how Smart Secretary operates in the preferred embodiment, a person skilled in the art will recognize that other techniques for combining sequences are possible. For example, to avoid the possibility of a call being routed too far away from the original destination (and also to avoid loops), the sequencer agent can only use the first entry in user B's sequence. All other routing destinations specified by user B are rejected.

One limitation of the approach taken in combining sequences in the preferred embodiment is the routing of calls to voicemail. In the above example, consider the possibility that the final destination specified by both users A and B (i.e., call destinations A3 and B3) are voicemail. In general, in choosing between the two voicemail destinations, it is preferable to route the call to user A's voicemail, since user A was the original destination of the call. This is handled in the preferred embodiment by having the sequencer agent recognize that one of the destinations in the inserted sequence is for a voicemail and not adding the voicemail destination to the sequence.

Figure 5:
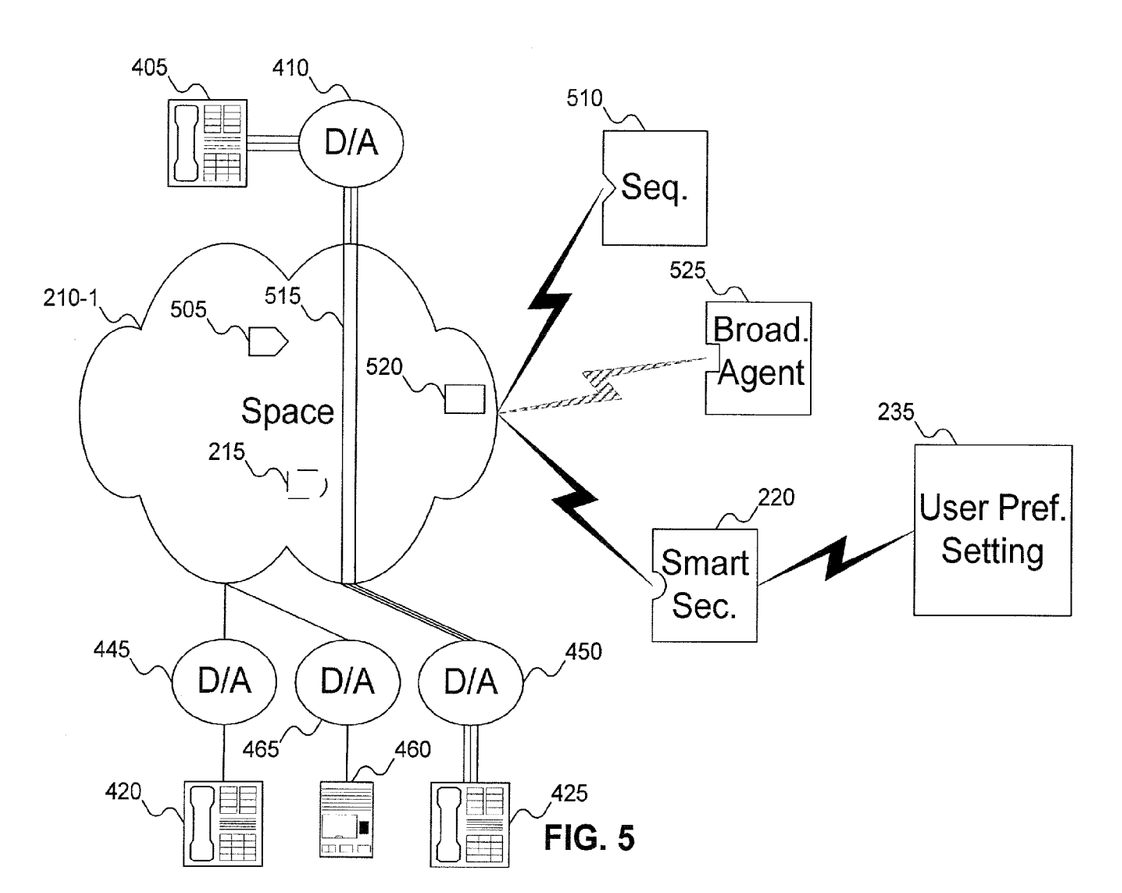
FIG. 5 shows a Smart Secretary according to the preferred embodiment placing a sequence object in the space.

FIG. 5 shows a Smart Secretary according to the preferred embodiment placing a sequence object in the space. In FIG. 5, Smart Secretary 220 has been notified by space 210-1 that smart secretary object 215 was dropped into the space. Smart Secretary 220 retrieves smart secretary object 215 and, after determining the user for which the object is destined, accesses user preference setting 235. User preference setting 235 indicates that object 215 is to be routed first to IP telephone 420, then to IP telephone 425, and finally to voicemail 460. Because a sequence of destinations is to be performed, Smart Secretary 220 drops sequence object 505 into space 210-1. Sequence 510 then picks up sequence object 505 and tries each of the destinations in turn. In FIG. 5, IP telephone 425 is answered, and so connection 515 is established between the caller and callee.

Alternatively, as described above, user preference setting 235 can specify a broadcast of the object to all possible destinations. For example, user preference setting 235 can specify that the object is to be broadcast to IP telephone 420, IT telephone 425, and voicemail 460. (In this example, voicemail 460 has been configured to respond to the object only after waiting a few seconds for someone else to have a chance to respond first.) Because a broadcast is to be performed, Smart Secretary 220 drops broadcast object 520 into space 210-1. Broadcast agent 525 then picks up broadcast object 520 and broadcasts the object to each of the destinations. In FIG. 5, IP telephone 425 picked up the object first, and so connection 515 is established between the caller and callee.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for routing calls in a communications system, comprising:
   receiving a call object in a persistent store identifying an incoming phone call for a recipient, wherein the persistent store allows insertion of objects without loss of attributes and has a notification service;
   translating the call object into a smart secretary object that the persistent store can operate upon;
   identifying the recipient from the smart secretary object;
   determining if an object exists within a community that includes the persistent store that provides preferences for the recipient;
   if an object does not exist that provides preferences for the recipient:
   translating the smart secretary object to a call object for a phone associated with the recipient; and
   ringing the phone associated with the recipient; and
   if an object does exist that provides preferences for the recipient, routing the call according to the preferences of the recipient.

2. The method of claim 1, the method further comprising examining call data associated with a call to avoid routing loops.

3. The method of claim 1, wherein routing the call according to preferences of the recipient further comprises:
   routing the call to a different recipient;
   determining if an object exists that provides preferences for the different recipient; and
   routing the call according to preferences for the different recipient.

4. The method of claim 3, the method further comprising returning to the preferences of the recipient after completing the routing of the call according to the preferences of the different recipient, if there is no answer at any numbers identified by the preferences of the different recipient.

5. The method of claim 1, wherein routing the call according to the preferences of the recipient further comprises routing the call sequentially to numbers identified by the preferences of the recipient.

6. The method of claim 1, wherein routing the call according to the preferences of the recipient further comprises broadcasting the call to number identified by the preferences of the recipient.

* * * * *